Aug. 2, 1932.    V. L. DU BOIS    1,869,741

VALVE

Filed Aug. 8, 1929

INVENTOR
Virgil L. DuBois
BY Arthur C. Brown
ATTORNEY

Patented Aug. 2, 1932

1,869,741

UNITED STATES PATENT OFFICE

VIRGIL L. DU BOIS, OF TULSA, OKLAHOMA, ASSIGNOR TO THE STOUGH TANK ERECTING COMPANY, OF TULSA, OKLAHOMA, A CORPORATION OF OKLAHOMA

VALVE

Application filed August 8, 1929. Serial No. 384,295.

My invention relates to gate valves and constitutes an improvement over my previous application for United States Letters Patent, Serial No. 350,274, filed March 27, 1929; the principal object of the invention being to provide wedge-actuated valve plugs for sealingly closing the flow channel through the valve and excluding sand, sediment or other foreign substance tending to interfere with opening and closing of the valve.

In accomplishing this and other objects of the invention, I have provided improved details of structure, the preferred forms of which are illustrated in the accompanying drawing, wherein.

Figure 1:
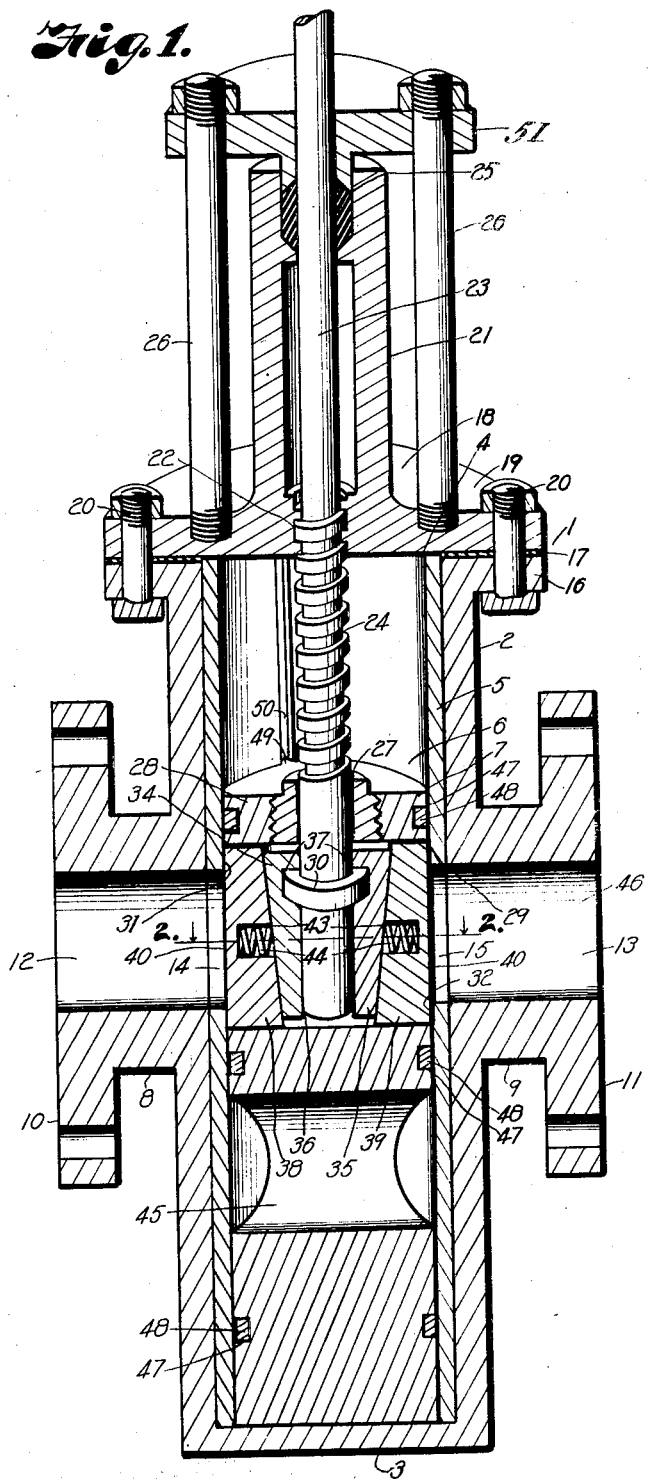
Fig. 1 is a central longitudinal section of a valve including my improvements, showing the valve closed.

Referring in detail to the drawing:

1 designates the valve housing including a cylindrical casing 2 having a closed bottom end 3 and open upper end 4, and lined with a bushing 5, forming a piston chamber 6 slidably and sealingly engaged by a piston 7.

Located substantially mid-way between opposite ends of the casing and extending outwardly from opposite sides thereof are neck portions 8 and 9 provided with apertured heads 10 and 11 for connection with adjoining sections of a flow line, and having horizontally aligning openings 12 and 13 registering with openings 14 and 15 in the side walls of the bushing, for communicating with the piston chamber 6.

Provided at the upper end of the casing 2 is a peripheral flange 16 fitted with a gasket 17 supporting a bonnet member 18 including a plate 19 secured to the flange by bolts 20 for closing the casing.

Formed integrally with the plate 19 is an upwardly extending neck 21 and extending through said neck and through a threaded opening 22 in plate 19 is an operating screw stem 23, the upper end of which extends through a packing gland 25 attached to the bonnet plate 51 by bolts 26 and is provided with an operating handle (not shown).

The lower end of the operating stem 23 extends slidably through a plug 27 in the head 28 of the piston 7 into a transverse opening 29 in the piston and is provided with an integral ring portion 30, the opening 29 being adapted for alignment with the openings 14 and 15 of the bushing 5 when the piston is at the downward limit of its travel, but of slightly greater diameter than the openings, to expose annular seating surfaces 31 and 32 on the bushing around the openings 14 and 15 when the opening 29 is aligned therewith.

Located in the opening 29 is a wedge 33 (Fig. 3) comprising mated halves 34 and 35 having longitudinal groves 36 on their inner faces fitting the stem 23 and having annular recesses 37 at the upper ends of the grooves for rotatably seating the ring portion 30 on the stem so that the wedge is moved longitudinally with the stem when the stem is rotated.

Mounted for transverse sliding movement in the opening 29 are valve plug members 38 and 39 having rounded outer faces 40 conforming to the walls of the bushing 5 and adapted for sealingly engaging the seating surfaces 31 and 32, and having vertically tapered inner faces 41 engaging the tapered surfaces 42 of the wedge members 34 and 35 to be moved thereby as will presently be described. Central openings 43 in the plug members 38 and 39 are fitted with coil springs 44 the inner ends of which engage the faces of the wedge members for yieldingly urging the plug members into frictional engagement with the walls of the casing.

Figure 2:
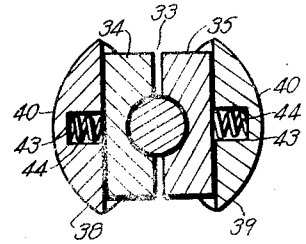
Fig. 2 is a transverse section through the valve plugs and the wedge on the line 2—2, Fig. 1.
Figure 3:
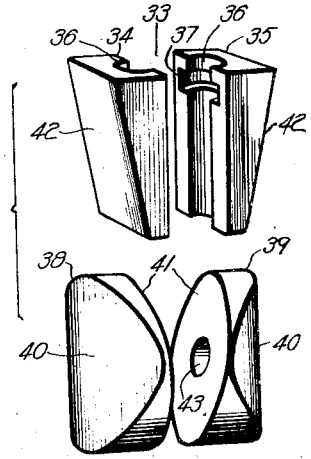
Fig. 3 is a detail perspective view of the disassembled valve plug and wedge members.

It will be noted from Figs. 2 and 3 that the plug members 38 and 39, when in functional position in the valve, are the equivalent of a single expansible plug substantially cylindrical on both longitudinal and transverse axes.

Provided in the piston 7 in spaced relation with the opening 29 is an opening 45 equal in diameter to the openings 14 and 15 of the bushing 5 and adapted for registering with said openings when the piston is at the upward limit of its travel, thus forming a through channel 46 for the flow of fluid through the valve.

Formed in the walls of the piston above and below the openings 29 and 45 are annular grooves 47 fitted with packing rings 48 forming a fluid tight seal with the walls of the bushing 5 and preventing escape of fluid to the portions of the chamber 6 at opposite ends of the piston 7.

Provided at the upper end of the piston is an outwardly projecting ear 49 engaging a longitudinal groove 50 in the bushing 5 for maintaining the openings 29 and 45 in proper working alignment with the openings 14 and 15 in the bushing.

With the parts constructed and assembled as described, the valve may be opened and closed by shifting the piston 7 in the chamber 6 by manipulation of the operating stem 23.

When the piston is shifted downwardly in the chamber 6 by clockwise rotation of the stem 23 for closing the valve, the lower end of the piston engages the bottom end 3 of the casing, causing the opening 29 to be concentrically aligned with the openings 14 and 15 of the bushing, a slight continued rotation of the stem causing the wedge 33 to continue downwardly, forcing the plug members 38 and 39 outwardly for sealingly engaging the seating surfaces 31 and 32 around the openings, as shown in Fig. 1.

In opening the valve, the stem 23 is rotated anti-clockwise for shifting the piston upwardly in the chamber for stop engagement with the bonnet 18, whereby the opening 45 of the piston is concentrically aligned with the housing openings to form the through channel 46, so that fluid may flow through the valve.

It is apparent that with the plug valve members located at opposite sides of the valve chamber, either member may alone seal the valve and prevent leakage should the other become impaired.

What I claim and desire to secure by Letters Patent is:

1. A valve of the character described including a casing having closed ends, a cylindrical chamber, a flow channel intersecting the chamber, a piston in said chamber having spaced transverse openings and adapted for stop engagement with the closed ends of the chamber for selectively aligning said openings with said channel, spaced plug members in one of said openings of larger diameter than said channel and conforming to the walls of the casing, a wedge member between said plug members, means for actuating the wedge members to extend the plug members, and means yieldingly urging the plug members outwardly from said wedge members.

2. A valve of the character described, including a casing having closed ends, a cylindrical chamber member in the casing having a longitudinal groove, the casing having a flow channel intersecting said chamber, a piston in said chamber having spaced transverse openings adapted for alignment with the flow channel, plug members in one of said openings radially extensible from opposite sides of said piston for closing said channel, a wedge for actuating said plug members, and a projecting ear on the piston in sliding relation with said longitudinal groove.

3. A device of the character described including a casing having a piston chamber and a channel communicating with said chamber, and provided with an internal longitudinal groove, a piston having spaced openings adapted to register with said channel, wedge means slidable in one of said openings to close said channel, and a stem engaged with said wedge means for operating the piston.

4. In a device of the character described including a casing having a cylindrical piston chamber and a flow channel intersecting said chamber, and a piston reciprocable in said chamber having spaced transverse openings registrable with said channel, wedge means slidable in one of said openings for closing said channel, and a rotative piston-operating stem threadedly mounted in the casing for operating said wedge means.

5. In a device of the character described including a casing having a cylindrical piston chamber and a flow channel intersecting said chamber, a piston slidable in said chamber having spaced transverse through openings registrable with said channel, a pair of plug members slidable in one of said openings for closing the channel, a pair of wedges respectively engaging said plug members, and means including a piston operating stem having an annular flange movably engaging said wedges for operating the plug members.

6. A valve of the character described including a casing having a cylindrical chamber, a flow channel intersecting the chamber, a piston slidable in said chamber and having a cylindrical transverse opening for alignment with said channel, an expansible plug member substantially cylindrical on longitudinal and transverse axes, located in said opening and sealingly engageable with the walls of the chamber for closing said channel, means for expanding the plug, and means associated with the chamber and piston for preventing rotation of the piston in said chamber.

In testimony whereof I affix my signature.

VIRGIL L. DU BOIS.